United States Patent
Kettner (12)

(10) Patent No.: US 6,234,256 B1
(45) Date of Patent: May 22, 2001

(54) POWER SCREW DRIVER WITH DAMPING DEVICE BETWEEN COVERED GRIP AND HOUSING

(75) Inventor: Konrad Kettner, Aalen (DE)

(73) Assignee: Cooper Power Tools GmbH & Co., Westhausen (DE)

(*) Notice: Subject to any disclaimer, the term of this patent is extended or adjusted under 35 U.S.C. 154(b) by 0 days.

(21) Appl. No.: 09/543,939

(22) Filed: Apr. 6, 2000

Related U.S. Application Data

(63) Continuation of application No. 09/051,888, filed as application No. PCT/EP96/04736 on Oct. 13, 1996, now Pat. No. 6,068,067.

(30) Foreign Application Priority Data

Oct. 31, 1995 (DE) .......................................... 295 17 258 U

(51) Int. Cl.[7] .................................................. B25D 15/00
(52) U.S. Cl. ...................... 173/210; 173/93.5; 173/162.2; 173/211
(58) Field of Search .................................. 173/210, 211, 173/162.1, 162.2, 93, 93.5, 93.6, 176; 464/67; 267/137; 81/57.31

(56) References Cited

U.S. PATENT DOCUMENTS

| 1,956,798 | * | 5/1934 | Janssen | 464/67 |
|---|---|---|---|---|
| 2,184,394 | | 12/1939 | Moretti | 192/30.5 |
| 2,583,147 | * | 1/1952 | Kaplan | 173/93.6 |
| 2,662,434 | | 12/1953 | Burkhardt | 81/52.3 |
| 2,907,239 | | 10/1959 | Schwenk | 81/52.3 |
| 3,589,489 | * | 6/1971 | Fehlings | 81/57.31 |
| 3,835,934 | * | 9/1974 | Schoeps et al. | 173/176 |
| 3,952,545 | | 4/1976 | Koeslin | 64/27 |
| 3,970,151 | * | 7/1976 | Workman, Jr. | 173/176 |
| 4,036,085 | | 7/1977 | Sjostrand et al. | 81/52.3 |
| 4,140,446 | | 2/1979 | Fernstrom et al. | 418/270 |
| 4,243,129 | | 1/1981 | Schoeps | 192/56 |
| 4,341,475 | | 7/1982 | Saladin | 366/211 |
| 4,535,850 | * | 8/1985 | Alexander | 173/176 |
| 4,635,732 | * | 1/1987 | Gotsch et al. | 173/162.1 |
| 4,691,786 | | 9/1987 | Fujita et al. | 173/12 |
| 4,875,528 | | 10/1989 | Thackston | 173/12 |
| 4,950,110 | | 8/1990 | Suzuki | 408/126 |
| 5,054,562 | * | 10/1991 | Honsa et al. | 173/162.2 |
| 5,080,180 | | 1/1992 | Hansson | 173/93 |
| 5,706,902 | | 1/1998 | Eisenhardt | 173/93.5 |
| 6,068,067 | * | 5/2000 | Kettner | 173/211 |

FOREIGN PATENT DOCUMENTS

| 83 10 596 U | 2/1986 | (DE) . |
|---|---|---|
| 39 37 816 A1 | 6/1990 | (DE) . |
| 41 43 218 A1 | 9/1992 | (DE) . |
| 35 03 032 C2 | 4/1994 | (DE) . |

\* cited by examiner

Primary Examiner—Scott A. Smith
(74) Attorney, Agent, or Firm—Coats & Bennett, PLLC

(57) ABSTRACT

A tool, in particular a power screw driver, comprises an output shaft which is rotatably mounted in a housing and is driven by a motor. The output shaft extends substantially coaxially to a longitudinal axis of the housing. In order to improve a tool of the type described in such a manner that the tool can be held comfortably, in controlled manner and with little force, a grip sleeve which is rotatable relative to the housing is fitted over the housing, and at least one damping device that counteracts a pulse-like rotation of the grip sleeve relative to the housing is disposed between the housing and the grip sleeve.

16 Claims, 2 Drawing Sheets

POWER SCREW DRIVER WITH DAMPING DEVICE BETWEEN COVERED GRIP AND HOUSING

The present application is a continuation of application Ser. No. 09/051,888, filed Jun. 22, 1998, now U.S. Pat. No. 6,068,067, which is a § 371 of PCT/EP96/04736 filed Oct. 31, 1996, which derived from German Application Serial No. 295 17 258.4, filed Oct. 31, 1995.

The present invention relates to a tool, in particular a power screw driver, comprising an output shaft which is rotatably mounted in a housing and is driven by a motor and which extends substantially coaxially to a longitudinal axis of the housing.

Such a tool is, for instance, known from DE 3503032 C2 or G 8310596. DE 3503032 C2 discloses a pneumatically operated power screw driver in which the substantially cylindrical housing simultaneously serves to hold the tool. The output shaft which is driven by a compressed-air motor projects from the housing and serves to transmit impacts to screws, nuts, or the like, which are to be tightened or unscrewed.

G 8310596 discloses a portable device for burring edges of drilled holes with very limited access possibilities. The corresponding housing simultaneously serves as a grip tube for the tool. An associated motor is accommodated in the housing and drives a shaft having an end that projects from the housing and has arranged thereat a tool head for removing burs.

In the two prior-art tools and, in particular, in the power screw driver, vibrations and impacts are observed in the entire tool. These vibrations or impacts are transmitted via the housing, which simultaneously serves as a grip member, to a user's hand. As a consequence, the hand and, in particular, the wrist are strained considerably. Such strain is intensified by the fact that because of the vibrations the user must firmly grip the tool in order to hold the tool in an accurate position.

It is therefore the object of the present invention to improve a tool of the type described in such a manner that the tool can be held comfortably, in controlled manner and with little force.

In connection with the features of the preamble of claim 1, this object is achieved by the measure that a grip sleeve which is rotatable relative to the housing is fitted over the housing, and at least one damping device that counteracts a pulse-like rotation of the grip sleeve relative to the housing is disposed between the housing and the grip sleeve.

Rotation of the grip sleeve relative to the housing is only observed in the case of impacts which are transmitted by tool vibrations or the like in pulse-like fashion to the grip sleeve. Such an impact and the associated pulse-like rotation of the grip sleeve relative to the housing are suppressed or at least attenuated by the damping device counteracting said rotation.

Such a damping device may be designed in the form of a shock absorber and may, for instance, function pneumatically or hydraulically.

In a preferred embodiment, the damping device is of a mechanical type and comprises at least one compression spring fixed between housing and grip sleeve. In such a case, the grip sleeve is only connected via the compression spring in non-rotatable fashion to the tool proper via the housing. The spring fully receives the developing starting torque of the motor and dampens the tool vibrations or impacts transmitted in pulse-like fashion to the grip sleeve.

To fix the compression spring relative to the housing and the grip sleeve in a simple manner, each of the damping devices comprises two abutment bodies which are acted upon by ends of the compression spring and which are arranged one after the other in the circumferential direction of housing and grip sleeve and are each in contact with the two members. As a result, the starting torque, the tool vibrations or other impacts are transmitted to the compression spring via the abutment bodies which are in contact with the housing, whereby said spring is tensed and exerts a restoring force in a direction opposite to the relative rotation between housing and grip sleeve, whereby said rotation is attenuated. This takes place in an analogous manner for the two possible rotational directions.

For an easy support of the damping device, the device is disposed between an annular flange which projects substantially radially from the housing, and an annular chamber which is formed at a first end of the grip sleeve and is open towards the annular flange. This yields a receiving means for the damping device that is defined by annular flange and annular chamber.

To locate the damping device in a simple manner between the annular flange and the annular chamber, the annular flange comprises a stepped portion which faces the annular chamber and which can be disposed at least in part in said chamber. The stepped portion forms an obstacle for the damping device by which the damping device is fixed in axial direction.

To form the annular chamber in a simple manner and directly next to the outside of the housing, it may be advantageous when the annular chamber is formed by an end section of the grip sleeve which is radially spaced apart from the outside of the housing.

To provide a smooth outside of the tool in this connection and to protect the damping device against damage and contamination at the same time, it is also of advantage when a free end of the end section ends in radially spaced-apart relationship with the stepped portion and extends in alignment with the outer end of the annular flange.

As a result of the aligned arrangement of the outer end of the annular flange and the free end of the end section, the tool is of a relatively smooth design and has a reduced number of edges.

For a simple arrangement of a plurality of damping devices, annular chamber and stepped portion comprise at least three circumferentially spaced-apart grooves for receiving a respective damping device, with the grooves being open in radial direction towards the housing and the grip sleeve, respectively, and in the axial direction. The damping device is here held by the respectively associated grooves of housing and grip sleeve In a simple embodiment, the grooves have the same length and/or are equally spaced apart Preferably, a corresponding groove length and a corresponding groove spacing are each 60°, based on an center point angle of a cylindrical grip sleeve.

Simple abutment bodies are formed by two abutment balls which are force-actuated by the compression spring towards groove ends. The abutment balls are easily insertable into associated grooves, with the groove ends possibly having a curvature adapted to the balls.

In an embodiment of the invention, the housing may be screwed by means of an inner thread to a motor sleeve at a rear end which is covered by the grip sleeve. To hold the grip sleeve on motor sleeve and housing, the motor sleeve is preferably provided at its end opposite to the housing with a radially projecting end stop for abutment on a rear end face of the grip sleeve. When housing and motor sleeve are screwed to one another, the grip sleeve is thus slid onto the housing and/or the motor sleeve. The grip sleeve can here be held between end stop of the motor sleeve and rear end of the housing with an axial play.

To bring the abutment balls into contact with all groove ends in the case of two associated grooves of housing and grip sleeve and to give the grooves in housing and grip sleeve a similar design at the same time, it is of advantage when the grooves in the stepped portion and in the grip sleeve have substantially the same depth in radial and axial directions. In one embodiment of the invention, the grooves in the stepped portion and in the grip sleeve may, for instance, be arranged in axial direction next to one another, with the abutment balls in axial direction engaging into both grooves and being in contact with the corresponding groove ends. In the radial direction, the balls can be fully received by the corresponding grooves. In another embodiment, the grooves in the grip sleeve and in the housing are opposite in radial direction, with the balls in radial direction projecting into the two grooves and being in contact with corresponding groove ends.

To ensure an adequate contact with the groove ends of the groove in the housing and in the grip sleeve, it is here advantageous when the groove depth in radial direction is substantially equal to the radius of the abutment balls.

To hold the balls and the compression spring in a simple manner, for instance, only in the grooves of the grip sleeve and, thereby, to simplify the assembly of housing and grip sleeve, an inner ring which is formed as a snap ring and which projects from an inside of the end section in the annular chamber of the grip sleeve and covers the grooves in axial direction is preferably used for retaining balls and compression springs.

Grip sleeve, housing and abutment balls may be made of steel or another suitable material.

An advantageous embodiment of the present invention will now be explained and described in detail with reference to the figures which are attached to the drawing, and of which FIG. 1 is a simplified view of a longitudinal section through a tool of the invention;

Figure 1:
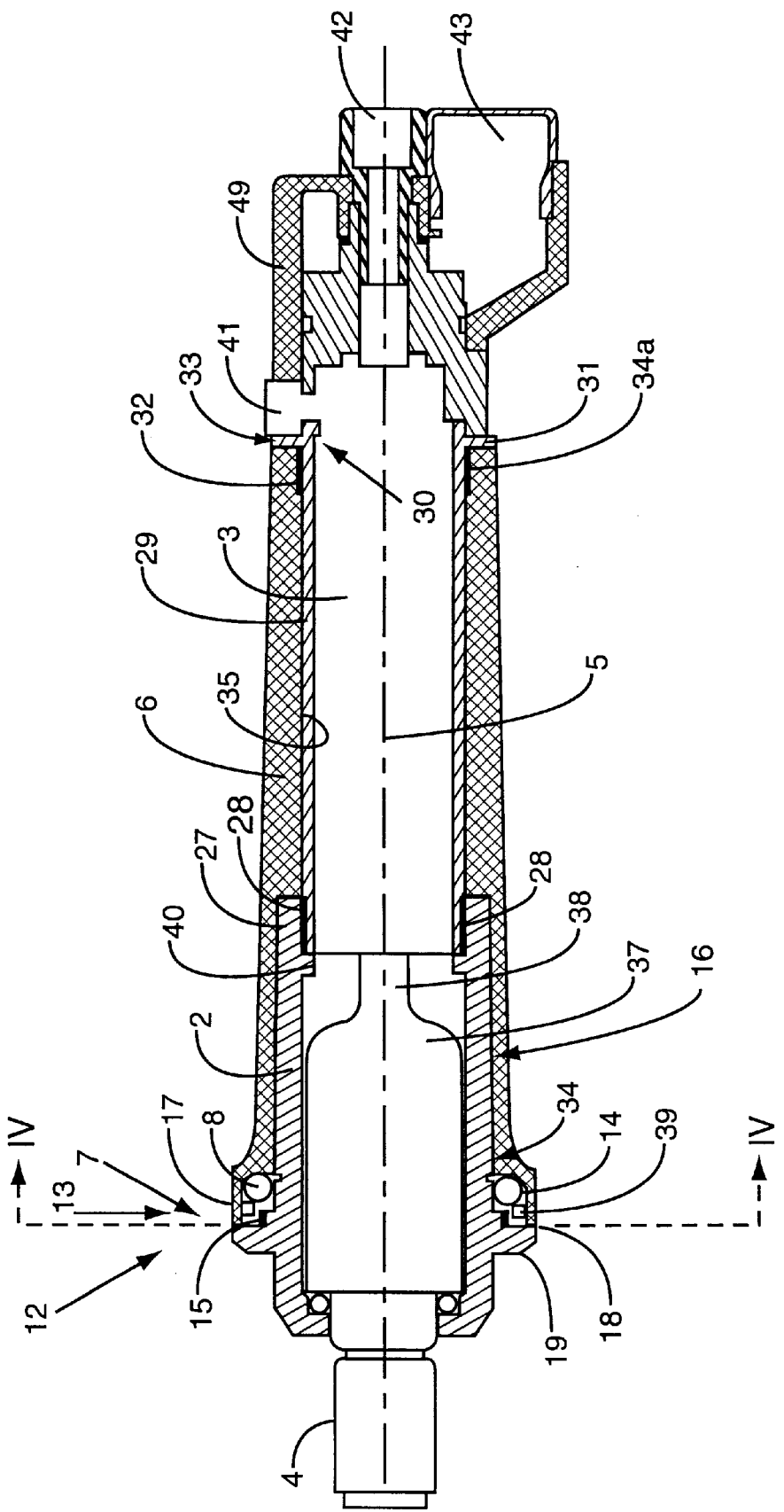

In the longitudinal section through tool 1 according to FIG. 1, the tool comprises a housing 2, a motor sleeve 29 and a grip sleeve 6 surrounding said motor sleeve.

Inside housing 2, a pulse unit 37 is rotatably supported with an output shaft 4 which is arranged in said unit. At an end of the output shaft 4 which projects from the housing 2, a screw head is formed for screwing or unscrewing screws or nuts. At the end which is opposite to the screw head, the pulse unit 37 is rotatably connected to a motor 3 by means of an attachment connection 38.

Motor 3 which extends approximately up to a switch button 41 for changing the rotational direction of the motor is arranged inside the motor sleeve 29. At an end of tool 1 which is opposite to the screw head, a casing 49 is attached and secured to the motor sleeve 29, with a supply air connection 42 and an exhaust air connection 43 being formed in the casing. The supply air connection 42 serves to supply compressed air to the motor 3, which is driven by compressed air.

Housing 2, grip sleeve 6 and motor sleeve 29 are formed in substantially rotationally symmetrical fashion relative to the longitudinal axis 5 of the tool or housing. The pulse unit 37 is rotatably supported in the housing 2 at the housing end which faces the screw head. An annular flange 12 radially projects outwards from the outside 16 of the housing 2 in spaced-apart relationship with the screw head. The annular flange 12 comprises an outer end 19 which extends partly in inclined fashion downwards towards the screw head. A section of the outer end 19 which extends in parallel with the longitudinal axis 5 has assigned thereto an end section 17 of the grip sleeve 6. This section is arranged in alignment with the outer end 19, the free end 18 thereof being arranged in close vicinity of the annular flange 12. The end section 17 extends substantially in parallel with the longitudinal axis 5 in its portion directly following the annular flange 12 and then extends in curved fashion towards housing 2.

An annular chamber 14 is formed between end section 17 and housing 2 and annular flange 12, respectively. The annular chamber 14 has arranged therein at least one damping device 7, of which a ball 8 is visible in FIG. 1 as an abutment body. The damping device 7 will be described in more detail in connection with FIG. 4.

The annular flange 12 has a stepped portion 15 which engages into the annular chamber 14. Said member and the end section 17 have arranged therebetween an inner ring 39.

Figure 3:
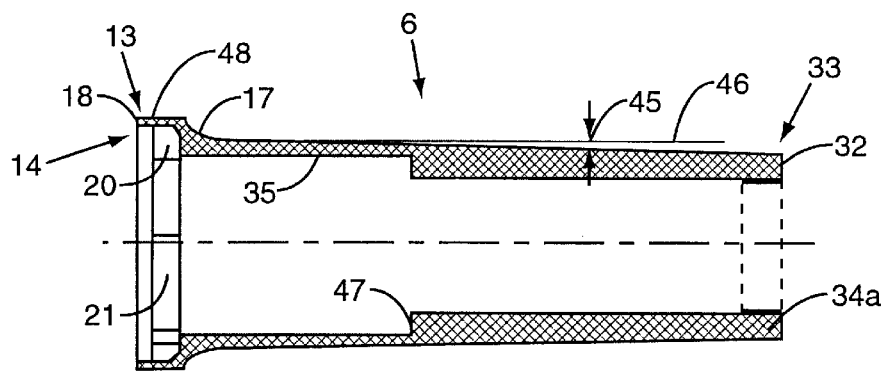
FIG. 3 shows a grip sleeve according to FIG. 1.

The grip sleeve 6 extends from its first end 13 formed by the end section 17 to the second end 33, with the grip sleeve 6 converging towards the second end 33; see, in particular, FIG. 3.

At its second end 33, grip sleeve 6 is, with an end face 32 formed at said end, in contact with an end stop 31 which radially projects outwards at the rear end 30 of the motor sleeve 29. The height of the end stop 31 corresponds to the thickness of the grip sleeve 6 at its second end 33. Furthermore, the grip sleeve 6 is in contact with a rear end 27 of the housing 2 via an inner step 47; see FIG. 3.

At its rear end 27, housing 2 is provided with an inner thread 28 by which it its screwed onto a corresponding outer thread of the motor sleeve 29. In the screwed state, a radially inwardly projecting inner shoulder 40 is in contact With the front end of the motor sleeve 29.

The inside 35 of the grip sleeve 6 is spaced apart from the outside 16, thereby leaving a gap-shaped space. Said space extends from a bearing ring 34, which radially projects from the outside 16, up to the rear end 27 of the housing 2. The bearing ring 34 is formed in direct vicinity of the annular chamber 14 in the outside 16 of the housing 2. An analogous bearing ring 34a is formed at the end 33 of the grip sleeve 6 and is in contact with the motor sleeve 29 from the outside.

Figure 2:
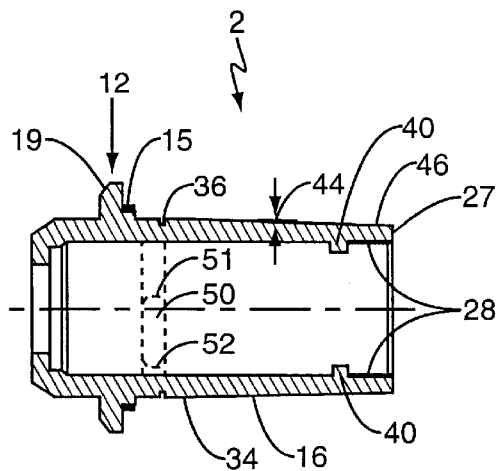
FIG. 2 shows a housing according to FIG. 1.

FIG. 2 solely illustrates the housing 2 of FIG. 1. Identical reference numerals characterize identical members and are only mentioned in part.

At the outside 16, the housing 2 comprises grooves 50 which are formed in the stepped portion 15 and extend in axial direction up to a surrounding annular groove 36. The grooves are circumferentially defined by groove ends 51 and 52. Bearing ring 34 is formed directly next to the annular groove 36. The bearing ring 34 is followed by a section which is offset to the inside by a distance 44 and extends up to the rear end 27. In this section, an outer diameter of the housing 2 is smaller by the distance 44 than an outer diameter in the area of the bearing ring 34. The outside 16 extends in the area of the reduced outer diameter substantially in parallel with a horizontal line 46.

Next to its rear end 27, housing 2 comprises an inner thread 28 which extends into the housing 2 up to an inner shoulder 40.

FIG. 3 solely illustrates the grip sleeve 6 of FIG. 1.

At the first end 14 of the grip sleeve 6, there is formed the end section 17 whose inside has formed thereon the annular chamber 14. Grooves 22, 21 which have an inner curvature 48 in accordance with the curvature of ball 8, see FIG. 1, are arranged in the annular chamber.

The inside 35 of the grip sleeve 6 has arranged thereon an inner step 47 which, when grip sleeve 6 is slid onto housing 2, is in contact with the rear end 27 thereof. At its second end 33, the grip sleeve 6 has an end face 32 which in the assembled state of tool 1 is in contact with the end stop 31 of the motor sleeve 29; see FIG. 1.

The grip sleeve 6 converges from the end section 17 to the second end 33, with a distance 45 increasing between the outside of the grip sleeve 6 and the horizontal line 46. At end 33, a radially projecting bearing ring 34a is formed on the inside 35.

Figure 4:
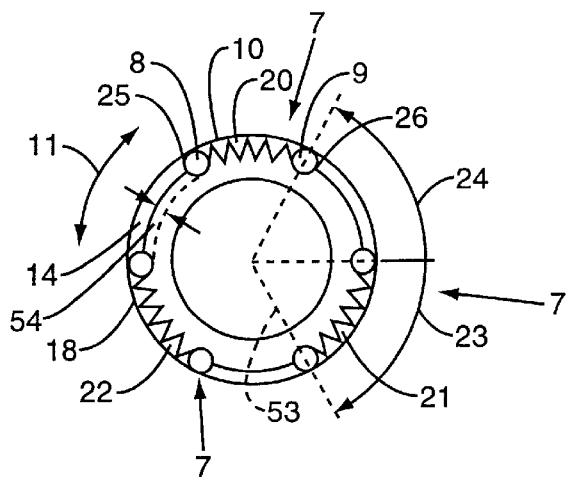
FIG. 4 is a section taken along line IV—IV of FIG. 1.

FIG. 4 illustrates a section taken along line IV—IV of FIG. 1. Three damping devices 7 are arranged inside the annular chamber 14. The devices are each composed of two balls 8 and 9 as abutment bodies, and of a compression spring 10 arranged between said bodies. Each damping device 7 is arranged in a groove 20, 21, 22 and 50. Balls 8, 9 are in contact with corresponding groove ends 25, 26 and 51, 52, respectively, of each groove.

The damping devices 7 extend in the circumferential direction 11 of the grip sleeve 6 and of the housing 2, respectively. The length of each damping device and groove, respectivley, based on the center points of the corresponding balls, corresponds to a center point angle 23 of 60°. The associated center point is formed by the longitudinal axis 5 according to FIG. 1.

The corresponding distance between two damping devices 7, based again on the center points of the balls, is also provided with a center point angle 24 of 60°. Hence, the lengths of the damping devices 7 in circumferential direction and the distances between the devices are identical in each case. Bails 8, 9 project by a projection 54 from the grooves 20, 21 and 22 of the grip sleeve 6 in the radial direction 53. This projecting portion of the ball is received by the grooves 50 of the housing 2. Hence, the two grooves 20, 21, 22 and 50 jointly form a receiving means for a damping device 7 that extends over a length 24 in the circumferential direction 11.

The operation of the tool according to the invention shall now be described briefly with reference to the figures.

When a relative movement or vibration is transmitted in pulse-like fashion in the rotational direction from the housing to the grip sleeve 6, the ball of a damping device that is the first one in rotational direction is also moved by the associated groove end of the housing groove in rotational direction. The second ball of the corresponding damping device remains in contact with the groove end of the grip sleeve groove, and the compression spring is consequently compressed. It is in this manner that a force is exerted in a direction opposite to the rotational direction, the force damping the pulse-like relative rotation or vibrations in the rotational directions. This applies analogously to the two rotational directions and to each associated pair of grooves in housing and grip sleeve.

What is claimed is:

1. A power screw driver adapted to minimize vibrations transferred to a user's hand, said power screw driver comprising:

a housing;

an output shaft rotatably mounted in said housing and driven by a motor, said motor distinct from said housing;

a grip sleeve both distinct from and rotatable relative to said housing and positioned around said housing; and at least one damping device disposed between said housing and said grip sleeve that minimizes vibrations transferred to a user's hand by counteracting induced instantaneous rotations of said grip sleeve relative to said housing.

2. The power screw driver of claim 1 wherein said at least one damping device comprises at least one compression spring fixed between said housing and said grip sleeve.

3. The power screw driver of claim 2 wherein said damping device further comprises two abutment bodies which are acted upon by ends of said compression spring.

4. The power screw driver of claim 3 wherein said abutment bodies are arranged one after the other along a circumferential direction of said housing, said abutment bodies in contact with said housing and said grip sleeve.

5. The power screw driver of claim 3 wherein said abutment bodies are two abutment balls force-actuated by said damping device toward a plurality of groove ends.

6. The power screw driver of claim 1 further comprising a motor sleeve positioned around said motor.

7. The power screw driver of claim 6 wherein said motor sleeve is threadably positioned at least partially within said housing.

8. The power screw driver of claim 6 wherein said grip sleeve extends substantially along an outer surface of both said housing and said motor sleeve.

9. The power screw driver of claim 1 further comprising a power switch in which communication with said motor for selectively turning on said motor.

10. The power screw driver of claim 1 wherein said housing further comprises an annular flange projecting substantially radially therefrom.

11. The power screw driver of claim 10 further comprising an annular chamber delimited by a first end of said grip sleeve and said housing.

12. The power screw driver of claim 11 wherein said damping device is positioned between said annular flange and said annular chamber.

13. The power screw driver of claim 11 wherein said annular flange has a stepped portion oriented toward said annular chamber.

14. The power screw driver of claim 13 wherein said annular chamber and said stepped portion comprise at least three circumferentially-spaced apart grooves for receiving a respective damping device, said grooves being open in a radial direction toward said housing and said grip sleeve.

15. The power screw driver of claim 14 wherein said grooves are of equal length and are equally spaced apart.

16. The power screw driver of claim 1 further comprising a pulse unit positioned inside said housing and having said output shaft arranged therewithin.

* * * * *